(12) United States Patent
Vallone et al.

(10) Patent No.: US 7,847,820 B2
(45) Date of Patent: Dec. 7, 2010

(54) INTELLIGENT EVENT DETERMINATION AND NOTIFICATION IN A SURVEILLANCE SYSTEM

(75) Inventors: Robert P. Vallone, Palo Alto, CA (US); Stephen G. Russell, San Francisco, CA (US); Thomas W. Kirkman, San Francisco, CA (US); Marcus S. Marinelli, Palo Alto, CA (US); J. Andrew Freeman, San Jose, CA (US)

(73) Assignee: 3VR Security, Inc., San Francisco, CA (US)

( * ) Notice: Subject to any disclaimer, the term of this patent is extended or adjusted under 35 U.S.C. 154(b) by 1327 days.

(21) Appl. No.: 11/082,026

(22) Filed: Mar. 15, 2005

(65) Prior Publication Data

US 2005/0271250 A1 Dec. 8, 2005

Related U.S. Application Data

(63) Continuation-in-part of application No. 10/965,687, filed on Oct. 13, 2004, now Pat. No. 7,697,026.

(60) Provisional application No. 60/554,050, filed on Mar. 16, 2004.

(51) Int. Cl.
*H04N 7/12* (2006.01)

(52) U.S. Cl. .................. 348/143; 348/150; 348/151; 348/152; 348/153; 348/154; 348/155; 348/156; 348/159

(58) Field of Classification Search .................. 348/143, 348/150–156, 159
See application file for complete search history.

(56) References Cited

U.S. PATENT DOCUMENTS 5,539,454 A 7/1996 Williams .................... 348/169

(Continued)

FOREIGN PATENT DOCUMENTS

EP 0 947 963 A1 6/1999

(Continued)

OTHER PUBLICATIONS

"Written Opinion of the International Preliminary Examining Authority" received in related International application No. PCT/US2005/008655.

(Continued)

*Primary Examiner*—Joseph G Ustaris
*Assistant Examiner*—Geepy Pe
(74) *Attorney, Agent, or Firm*—Hickman Palermo Truong & Becker LLP

(57) ABSTRACT

A method that determines whether a detected event is a significant event requiring action in a video surveillance system. Determined event attributes and object attributes are analyzed to determine if the potential event should trigger an action by the surveillance system. If the potential event should trigger an action, at least one action is triggered. Actions may include relevant event attribute and object attribute information.

Potential event may include events detected by a sensor, or external events communicated by an external system to the surveillance system. Event attributes may include location and type of the potential event. Object attributes may include an identification of an object, and attributes associated with the identified object. If an object cannot be positively identified, object attributes may include potential object identifications or determined group associations of the object.

40 Claims, 4 Drawing Sheets

U.S. PATENT DOCUMENTS

| | | | |
|---|---|---|---|
| 6,097,429 A | 8/2000 | Seeley et al. | |
| 6,154,133 A | 11/2000 | Ross et al. | |
| 6,184,926 B1 | 2/2001 | Khosravi et al. | |
| 6,188,381 B1 | 2/2001 | van der Wal et al. | 345/112 |
| 6,476,858 B1 | 11/2002 | Ramirez Diaz et al. | |
| 6,542,075 B2 | 4/2003 | Barker et al. | |
| 6,583,813 B1 * | 6/2003 | Enright et al. | 348/150 |
| 6,646,676 B1 | 11/2003 | DaGraca et al. | |
| 6,725,383 B2 | 4/2004 | Kyle | |
| 6,791,603 B2 | 9/2004 | Lazo et al. | |
| 2002/0030738 A1 | 3/2002 | Moreinis et al. | |
| 2003/0123713 A1 | 7/2003 | Geng | |
| 2004/0001142 A1 | 1/2004 | Kumhyr | |
| 2004/0001615 A1 | 1/2004 | Philomin et al. | |
| 2004/0008258 A1 | 1/2004 | Aas et al. | |
| 2004/0028391 A1 | 2/2004 | Black et al. | |
| 2004/0042643 A1 | 3/2004 | Yeh | |
| 2004/0078260 A1 | 4/2004 | Milgramm et al. | |
| 2004/0080615 A1 | 4/2004 | Klein et al. | |
| 2004/0086093 A1 | 5/2004 | Schranz | |
| 2004/0095236 A1 | 5/2004 | Sobol | |
| 2004/0117638 A1 | 6/2004 | Monroe | |
| 2004/0130620 A1 | 7/2004 | Buehler et al. | |
| 2004/0161133 A1 | 8/2004 | Elazar et al. | |
| 2004/0183667 A1 | 9/2004 | Nicoletti et al. | |
| 2005/0232462 A1 | 10/2005 | Vallone et al. | 382/103 |

FOREIGN PATENT DOCUMENTS

| | | | |
|---|---|---|---|
| WO | WO 03/047258 A1 | 6/2003 | |

OTHER PUBLICATIONS

Pending claims of related International application No. PCT/US2005/008655.

Notification of Transmittal of the International Search Report and the Written Opinion of the International Searching Authority, or the Declaration received in PCT International application No. PCT/US2005/008655.

Pending claims of PCT International application No. PCT/US2005/008655.

"Notification of Transmittal of the International Preliminary Report on Patentability" received in International application No. PCT/US2005/008655.

Current claims of PCT/US2005/008655.

"Notification of Transmittal of the International Preliminary Report on Patentability" received in International application No. PCT/US2005/008735.

Current claims of PCT/US2005/008735.

* cited by examiner

INTELLIGENT EVENT DETERMINATION AND NOTIFICATION IN A SURVEILLANCE SYSTEM

PRIORITY CLAIM

This application claim the benefit of priority to U.S. Provisional Patent Application No. 60/554,050 filed on Mar. 16, 2004, entitled VIDEO INTELLIGENCE PLATFORM; and priority to and is a continuation in part of U.S. patent application Ser. No. 10/965,687, now U.S. Pat. No. 7,697,026, entitled PIPELINE ARCHITECTURE FOR ANALYZING MULTIPLE VIDEO STREAMS, filed on Oct. 13, 2004; and is related to U.S. patent application Ser. No. 11/081,753, now U.S. Pat. No. 7,529,411, entitled INTERACTIVE SYSTEM FOR RECOGNITION ANALYSIS OF MULTIPLE STREAMS OF VIDEO, filed on Mar. 15, 2005, the contents of which are herein incorporated by reference in their entirety for all purposes.

FIELD OF THE INVENTION

The present invention relates to event determination and alarm notification in a video surveillance system, and more particularly, to a method of providing intelligent event notifications based upon identification of specific objects by the surveillance system, information associated with identified objects, and external information.

BACKGROUND

Video surveillance systems have wide application and can be used in a number of settings such as residential, commercial, governmental and industrial. Typically, one or more video cameras are strategically positioned in a protected or secure area and used to capture images of people and other objects that come within the range of the cameras. Video surveillance systems can transmit surveillance information across networks via wire-based and wireless technology, and across the Internet.

The feed from the video cameras in a surveillance system is usually directed to a monitoring station, such as a security guard station, or a central service, that provides monitoring services to a number of protected areas. A live video feed requires constant vigilant monitoring in order to detect security breach events. If there is no user who is actively watching the camera images, suspicious or undesired activity could go undetected.

Alternatively or in addition to real-time monitoring, many surveillance systems record and store surveillance footage to video tape or other medium for future reference and analysis. However, review of recorded footage alone may be insufficient in real-time applications that require immediate detection of security breaches.

In those systems in which video footage is recorded, all activity captured by a camera is typically saved, requiring a user to watch what are generally lengthy footages of video, much of it likely being uneventful and monotonous to the user, in order to locate the relevant sequences that provide information about security breach events. This review process requires diligent time commitment on the part of a monitoring user, and the delay associated with reviewing footage after it is recorded may result in loss of intervention opportunities.

Humans are limited in the amount of visual information they can process in tasks like video monitoring, whether live or recorded. After a time, significant security events can easily go unnoticed. In addition, in order to fully monitor an area, multiple cameras are generally required. As the number of cameras in a surveillance system increases, however, the amount of raw information that needs to be processed and analyzed also increases. Monitoring effectiveness is greatly reduced when multiple live videos must be monitored, and the amount of time needed to review stored footage likewise greatly increases with additional stored footage from multiple cameras.

Typically, the stored video recordings from a surveillance system are unstructured and unindexed. Most of the recorded footage is uninteresting and unimportant. Without an efficient means to locate significant security events in the footage, it is not cost-effective for security personnel to monitor or record the output from all available cameras in a multi-camera surveillance system.

A system that captures video images and/or audio without requiring a user to actively monitor the captured images or audio or requiring the user to later review voluminous amounts of recordings is needed.

In order to assist users monitoring video images from security cameras, some security or surveillance systems have incorporated motion detection sensors or functionality. Motion detection sensors may include infrared sensors which detect changes in temperature in the monitored area, or ultrasonic/microwave sensors that detect moving objects in their field of detection. Alternatively, a method of analyzing video from surveillance cameras to automatically detect motion can be used. When motion is detected, whether by external sensor or video motion detection, a signal is delivered to a monitoring system, which may sound an alarm, trigger video recording, or report the incident to a security guard station or central service as a potential security breach.

However, in complex security systems with a large number of cameras covering an area with a wide variety of possible activities, simple motion detection, whether through external sensors or video detection, is inadequate. That is, if every motion detected by the system caused the system to generate an alert, many "false alarms" would be created.

It is desirable to provide an improved surveillance system that reduces the number of false alarms by performing analysis on multiple video feeds to intelligently detect significant events.

In addition, with current surveillance systems, a receiver of an alarm sent by the surveillance system only knows that an event which may or may not be a security breach has occurred. The receiver has no other knowledge by which he can determine if the alarm signals the presence of a real intruder, or if it is a false alarm. In addition, the receiver has no other knowledge that reflects the level or type of potential security breach.

A system that automatically detects the occurrence of a significant event based upon data captured and transmitted from multiple cameras, optional detection equipment, and other stored information is needed. Upon determining that a significant event has occurred, the system should take action appropriate for the determined significant event, such as automatically generating and transmitting a notification in a manner that assists the receiver in understanding the nature of the event and taking action most appropriate for the determined event.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

SUMMARY OF EMBODIMENTS OF THE INVENTION

Techniques are provided for determining whether a significant event requiring action has occurred in a surveillance system.

In one embodiment, a method is provided for determining whether a detected event is a significant event requiring action in a surveillance system. The method includes detecting a potential event, determining (1) attributes about the potential event ("event attributes") and/or (2) attributes about an object in a video surveillance image associated with the potential event ("object attributes"). The event attributes and object attributes are analyzed to determine if the potential event should trigger an action by the video surveillance system. If the potential event should trigger an action, at least one action is triggered.

The techniques described herein are not limited with respect to the types of potential events that may be detected. For example, the potential event may be an event detected by a sensor, through video motion detection. Alternatively, the event may be an external event communicated by an external system to the surveillance system.

Event attributes may include, for example, the time, location and type of the potential event. However, the event attributes of the potential event may vary based on the type of the potential event. Thus, the techniques described herein are not limited to a specific set of event attributes.

Object attributes may include, for example, an identification of an object, and attributes associated with the identified object. If an object cannot be positively identified, object attributes may include potential object identifications or determined group associations of the object.

The system determines which action to perform, as a response to detecting the potential event, by analyzing event attributes and object attributes.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF EMBODIMENTS OF THE INVENTION

Figure 1:
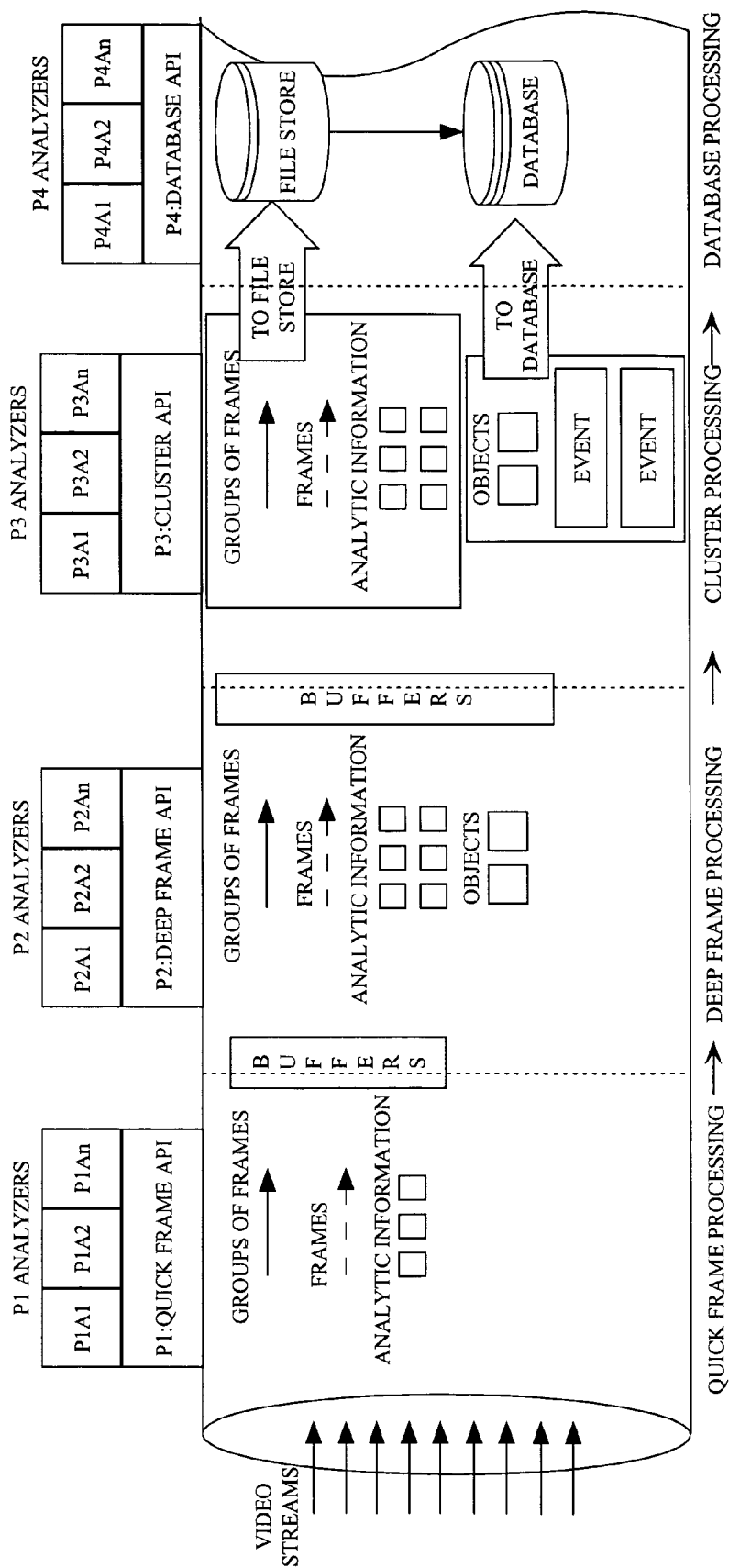
FIG. 1 is a block diagram that illustrates a multi-camera video processing pipeline architecture upon which an embodiment of the invention may be implemented.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

A surveillance system is described hereafter, in which multiple sources of information are used to intelligently detect a significant event. When a significant event is detected, the system determines the appropriate action to take based on the nature of the event and other related external or stored information. Significantly, the system can identify a particular object or person, and determine information associated with the identified object or person. Based on the identified person, the system can determine an appropriate action to take (such as generating a notification). The notifications generated by the system can be delivered using a number of alternative means. The system may use stored information and/or external information to determine the occurrence, type and level of a security event.

Video surveillance is a common security technology that has been used for many years. A surveillance system that includes recognition capabilities to identify objects in the video images acquired by the surveillance system is described in co-pending U.S. patent application Ser. No. 11/081,753, now U.S. Pat. No. 7,529,411, entitled INTERACTIVE SYSTEM FOR RECOGNITION ANALYSIS OF MULTIPLE STREAMS OF VIDEO, filed on Mar. 15, 2005, the contents of which are herein incorporated by reference in their entirety for all purposes. In the system described in this co-pending application, hereinafter referred to as the "Recognition" application, a person can be reliably recognized or identified by a surveillance system operating in a naturalistic environment through facial recognition techniques that utilize multiple sets of identifying information associated with each person.

Object recognition may be used by the system to provide for intelligent event detection and notification. For example, in one embodiment, an alarm is generated when a person authorized to be in one location is recognized as being in another location for which he does not have authorization.

In a video surveillance system that incorporates facial recognition techniques, a single frame of a surveillance video clip that contains an image of a person's face is identified, facial identification information is extracted from the image, and then compared with stored identifying information of faces of known persons. In the system disclosed in the Recognition application, multiple sets of identifying information are stored for each person known by the system. The sets of identifying information are created from naturalistic images of the person caught by the surveillance system and positively identified by an expert user. By using multiple sets of identifying information derived in the naturalistic surveillance environment, the recognition techniques disclosed in the Recognition application can be used to reliably identify a person or object.

Although a method of determining whether a significant event has occurred, and determining actions based on the event, is described using the facial recognition method disclosed in the co-pending Recognition application, embodiments of the intelligent event determination and notification method disclosed herein could be used by any type of system that performs reliable object recognition. The specific techniques disclosed in the Recognition application are not required.

Exemplary System

Figure 3:
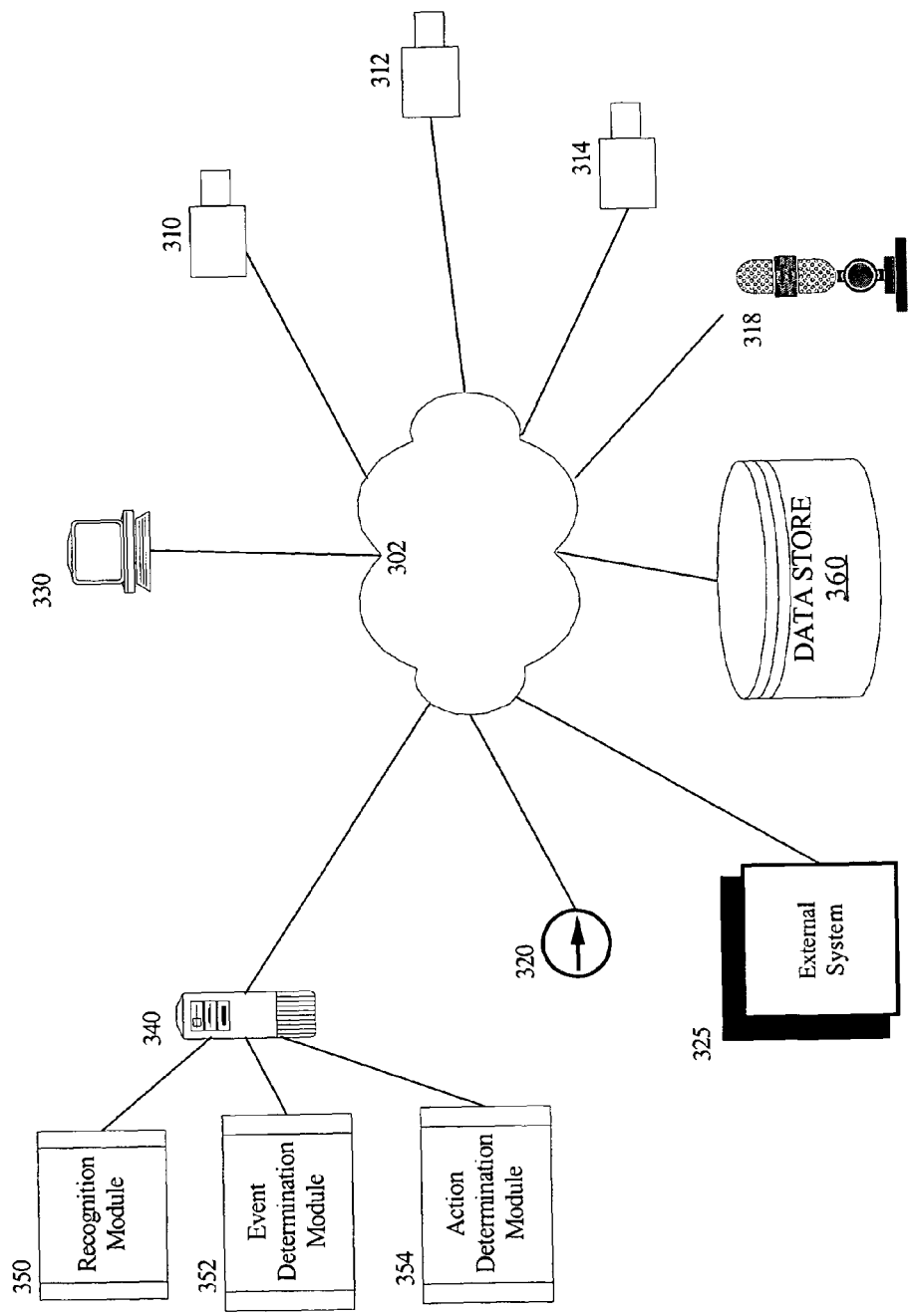
FIG. 3 is a diagram that illustrates a high-level view of a video surveillance network on which an embodiment of the invention may be implemented.

FIG. 3 illustrates a high-level pictorial representation of a video surveillance network 300 in which an embodiment of the present invention may be implemented. As shown, video cameras 310, 312, 314 are connected to surveillance network 302, as are audio recorder 318, server 340, sensor 320, external system 325, notification terminal 330 and data store 360. Network 302 is the medium used to provide communications links between various devices and computers connected together within the system. Surveillance network 302 may be implemented as any type of network, such as an intranet, a local area network (LAN), a wide area network (WAN), or any combination thereof. The network 302 may also comprise secure connections to the Internet. Network 302 may include connections such as wire, wireless communication links, or fiber optic cables, for example. Alternatively, instead of a network, some or all of the components of the surveillance system may be directly connected to each other.

Recognition module 350 extracts identifying information from the images produced by cameras 310, 312, 314 and/or voice recorder 318. For example, any face finding, extracting and identifying routines known to those skilled in the art that can be used to extracting information and identify an object may be used. Recognition module 350 then processes the extracted identifying information to determine if the extracted identifying information matches identifying information stored in data store 360. Any method known to those skilled in the art can be used to compare extracted facial identifying features. Recognition module 350 may also include sound recognition functionality that distinguishes between known and unknown sounds. For example, recognition module 350 may include voice recognition functionality that compares voice samples taken with audio recorder 318 and compares them with known voiceprints stored in data store 360. Many implementations of voice recognition are known to those skilled in the art and can be used.

As shown in FIG. 3, recognition module 350 may be a component of server 340. Alternatively, recognition module 350 may reside in a separate computer dedicated to performing just object recognition.

Video cameras 310, 312 and 314 may be any cameras used in a video surveillance system, either visible or hidden from persons surveyed by the surveillance system. Cameras 310, 312, 314 may operate in the visual range of the electromagnetic spectrum or may include other ranges including infrared (IR) and ultraviolet (UV). In addition, a camera may also have light amplification capabilities for low light conditions. Cameras 310, 312, 314 may be identical, or each may have different capabilities.

Audio recorder 318 may be used in conjunction with the images acquired by cameras 310, 312, 314 to identify an object. While shown in the example embodiment of FIG. 3, audio recorder 318 is not required. In one embodiment, cameras 310, 312, 314 may include audio recording functionality, which may be used as audio recorder 318.

Data store 360 may contain one or more databases of video data recorded by cameras 310, 312, 314. Video data stored in data store 360 may include single frames or images, as well as video clips. Data store 360 may also include one or more databases of audio or voice samples captured by the surveillance system. In addition, data store 360 may also contain one or more reference databases of identifying information associated with objects or persons whose image was obtained by a camera in the multi-camera surveillance system. Data store 360 may contain additional databases that store surveillance system management information, which may include information relating to the objects recognized by the system, such as group membership, employment information, security level and authorization time ranges, as discussed in more detail herein. Data store 360 may be one device. Alternatively, each database in data store 360 may be stored on separate storage devices in separate locations. Data store 360 is intended to include any computer that stores video data, object identifying information and other surveillance system management information. Video data stored in the system may include video data captured by cameras in the surveillance system, or may originate outside of the surveillance system. Data store 360 is accessible by recognition module 350 to compare object identification information extracted from images acquired by cameras 310, 312, 314 to identification information stored in a database in data store 360.

The surveillance system shown in FIG. 3 includes sensor 320 and external system 325. Sensor 320 may be any type of sensor that could be used by a surveillance system, such as a motion detection sensor or smoke detector. External system 325 may be any type of external system that can communicate with surveillance system 300, such as an alarm system, environmental input system, access control system or biometric identification system. Sensor 320 and external system 325 are optional. Zero, one or more of each may be included.

Surveillance system 300 may include additional detection means, servers, clients and other peripheral devices not shown. For example, surveillance system 300 may also include Radio Frequency identification transponders used to identify individuals or objects to which the transponder is attached. FIG. 3 is intended as an example, and not as an architectural limitation for the present invention.

Event determination module 352 determines whether an event that requires an action, such as a notification, has occurred. An event that triggers the system to take an action is called a "significant event." As discussed above, not all events detected by the system may be significant enough to notify a user or take some other kind of action. By determining whether an event is significant, embodiments of the present invention reduce the number of false alarms generated by the surveillance system. Event determination module 352 may access information stored in data store 360, such as surveillance system management information, video data from other cameras in a multi-camera system and/or information from an external system 325 when determining whether a significant event has occurred. Methods of implementing event determination module 352 are discussed herein.

Action determination module 354 determines the appropriate action to take once it has been determined that a significant event has occurred. Typical actions include notifications sent to notification terminal 330. Other types of action may include powering on additional cameras, changing the orientation of cameras, changing the resolution of cameras, sounding an alarm, or causing an area to be locked down. Action determination module 354 may access information stored in data store 360, such as surveillance system management information, images from other cameras in a multi-camera system and/or information from an external system 325 when determining action(s) to take upon occurrence of a significant event. Methods of implementing action determination module 354 are discussed herein.

Notification terminal 330 receives significant event notifications. Notification terminal 330 is located in an area accessible to a user. In certain embodiments, notification terminal 330 may be a personal computer. In other embodiments, notification terminal 330 may be a phone. Notification terminal 330 may also be an email address, beeper, pager, or wireless device such as an electronic organizer or any device for receiving notification. In certain embodiments, notification terminal 330 is located remotely from surveillance network 302. Notification terminal 330 may be located in close proximity and may even be directly connected to surveillance network 302. In one embodiment, notification terminal 330 is part of server 340. In another embodiment, notification terminal 330 may have a wireless connection to surveillance network 302. All that is required is that notification terminal 330 be capable of receiving notifications transmitted from surveillance network 302.

Through recognition module 350, event determination module 352 and action determination module 354, reliance on the continuing vigilance of an operator to detect an intrusion or other security breach is eliminated. The system permits passive, as opposed to active, monitoring, thereby permitting a user to monitor activities captured by cameras 310, 312, 314 without being required to continuously watch the transmitted images. The amount of time a user watches monotonous reels of prior camera recordings or views multiple monitors that are receiving data transmitted from multiple cameras is significantly reduced. Furthermore, users are not constantly being alerted to false alarms, and are only notified when a significant event requiring their attention occurs.

Surveillance System with Pipeline Architecture

One specific example of multi-camera architecture that could be used to implement an embodiment of the present invention is disclosed in co-pending application U.S. patent application Ser. No. 10/965,687, now U.S. Pat. No. 7,697,026, entitled PIPELINE ARCHITECTURE FOR ANALYZING MULTIPLE STREAMS OF VIDEO, filed on Oct. 15, 2004, the contents of which are herein incorporated by reference in their entirety for all purposes. FIG. 1, taken from this co-pending application, hereinafter referred to as the "Pipeline Application", illustrates an embodiment of the multi-camera pipeline architecture that may be used.

In the system disclosed in the Pipeline application, the content of multiple video streams is analyzed to identify objects and potential events of interest in the video stream from multiple cameras. For example, a surveillance video stream may be analyzed to recognize faces, gestures, vehicles, guns, motion, and the like.

The video processing pipeline architecture disclosed in the Pipeline application provides for parallel analysis of multiple input video streams, each video stream originating from a respective video camera in the surveillance system, at multiple stages of processing.

In one embodiment, the pipeline comprises four different successive stages of processing: (1) quick frame processing; (2) deep frame processing; (3) cluster processing; and (4) database processing. Due to the nature of the pipeline, applications plugged into the pipeline, via application program interfaces (APIs) associated with each respective stage, can perform increasingly more complex analysis at each successive stage of processing.

Generally, as the videos flow down the pipeline, (1) portions of the videos that are considered uninteresting are removed from the videos, thereby reducing the size of the videos that flow further down the pipeline; (2) portions of the videos that are considered interesting to an application at a given stage are analyzed, with a goal of identifying features, activities, objects, etc. of interest; and (3) analyzed portions of the videos may be annotated by the analyzing applications, with information that describes what the applications identified as interesting in that portion of the video with objects and/or events identified.

Stage 1 of the pipeline processing ("P1") is referred to as "quick frame" processing. Quick frame processing is lightweight processing (i.e., not relatively resource-intensive and computationally complex) performed in real-time as the video streams flow into the pipeline. Various applications tailored to recognize and identify certain occurrences may plug into the pipeline via the quick frame API, to perform fast lightweight operations, such as noise reduction, video motion detection, gross object finding (e.g., a vehicle or person), object tracking, frame area filtering, and the like. For example, Event Determination Module 352 may include a video motion detection P1 process, and Recognition Module 350 may include a gross object filtering P1 process.

Stage 2 of the pipeline processing ("P2") is referred to as "deep frame" processing. Any number of video analysis applications (referred to in FIG. 1 as P2 Analyzers, P2A1, P2A2, P2An) can access the video feeds from the buffers that reside between quick frame and deep frame stages, through a deep frame API. Various applications tailored to recognize and identify certain occurrences may plug into the pipeline via the deep frame API, to perform more computationally complex and resource-intensive analyses than with quick frame processing. For example, deep frame analyses of the video streams may include face finding, license plate recognition, complex object detection (e.g., gun finding), feature extraction, and the like.

When the techniques described herein are described in terms of a pipeline architecture system, an application to identify frames or surveillance video from a camera that contains image(s) of a person's face may be included as a "P2" application using the deep cluster API. Likewise, an application used by Recognition module 350 to extract features from faces identified in frames of surveillance video may also be included as a "P2" or "P3" application.

If any P2 analyzer finds particular frames to be of interest, then the analyzer determines what type of analysis to perform on the snippet or frame and creates objects based thereon. For example, a P2 analyzer may create a motion object that includes information that characterizes that motion occurred in a given camera view (i.e., a given video stream) started at time X and ended at time Y. Objects created at the deep frame processing stage typically contain a pointer to one or more relevant frames, and the additional information about the content of the frame on which the object is based. Sequences of objects are output from the deep frame processing stage and, in one embodiment, are queued in a buffer between the deep frame processing stage and the cluster processing stage.

Stage 3 of the pipeline processing ("P3") is referred to as "cluster" processing. Any number of video analysis applications (referred to in FIG. 1 as P3 Analyzers, P3A1, P3A2, P3An) can access the video feeds and other information from buffers that are between deep frame and cluster stages, through a cluster API. Various applications tailored to recognize and identify certain occurrences may plug into the pipeline via the cluster API, to perform analyses on the video streams across time (i.e., across frames in the same video stream) and across cameras (i.e., within a "cluster" of cameras that, for analysis purposes, are treated as an entity). For example, events based on analyses of the video streams at the cluster stage of processing may include various tailored analyses and construction of associated events, such as person or face events, alert generation events, externally triggered events, and the like.

An event that is constructed based on video feeds from multiple cameras (i.e., a cluster of cameras) is referred to as a "cluster event." Cluster events provide information to intelligently describe what occurred in a building lobby rather than what happened in view of camera X, where camera X is only one of a plurality of cameras operating in the lobby. For example, a cluster event may describe that a person walked through a building lobby, through a door, and down a hallway, based on the video streams from a cluster of cameras whose collective view covers the lobby, the door and the hallway.

Events, either cluster events or non-cluster events, are constructed by P3 analyzers at the cluster stage of processing, based on video received from the deep frame stage and/or information extracted from objects output by the deep frame analyzers. Events are output from the cluster stage and stored in a database. In one embodiment, each event is embodied as a row in a database table, where each row contains (1) information that describes whatever the analyzer determined about what occurred in the area observed (i.e., the content of the video frames or snippets), for which the event was constructed, and (2) references to the frames or snippets that are associated with the event, if desired or necessary, including pointers to the frames or video clips in a file store. The P3 analyzer applications determine what information to store in the database in association with an event.

At the cluster stage of processing, events can be defined by, constructed based on, or triggered by, events external to the associated video streams. For example, activation of a fire alarm in a monitored building may spur a request from a user or application to begin construction of a "fire alarm" event, in order to observe what happens in the building subsequent to activation of the fire alarm, and/or what happened in the building prior to activation of the fire alarm. For another example, activation of a fire alarm may trigger a P3 analyzer that is monitoring the building to automatically begin construction of a "fire alarm" event, in order to observe happenings in the building around the time of the fire alarm.

Further analysis and reasoning can be applied to events, or combinations of events, that are stored in the database. From a database record containing pointers to the location in the file store at which frames and snippets are stored, the associated frames and snippets can be replayed and reviewed, for example, by a user via a display monitor or by database stage analyzer applications via a database API. As discussed in more detail below, the Event Determination Module may include P3 applications that use the cluster API.

Stage 4 of the pipeline processing ("P4") is referred to as database processing. Any number of video analysis applications (referred to in FIG. 1 as P4 Analyzers, P4A1, P4A2, P4An) can access event records from the database for database processing, through the database API. Various applications tailored to perform complex analysis across events and across clusters may plug into the pipeline via the database API, to perform analyses such as historical analyses, person/place/time reports, object/person associations and identification, and the like. As discussed in more detail below, the Action Determination Module may include P4 applications that use the database API.

The pipeline architecture enables the use of correlation processing among different analyzer applications at any of the stages of processing along the pipeline. Correlation processing involves establishing and evaluating rules that apply to the results of more than one analyzer at a given stage of processing. The rules contain conditions based on the results of each of the relevant analyzers, and disposition of the conditions are used to make decisions. For example, if one analyzer determines that a frame "might" contain a person and if another analyzer determines that the frame "might" contain a gun, neither determination of which is independently enough for the respective analyzers to create an object based thereon, then a conditional correlation rule may be applied to those discrete determinations to determine that an object should be created for that frame and passed down the pipeline for further processing.

Correlation processing may be implemented, for example, using a correlation analyzer application that reviews the results of the analyzers on which conditions are established, evaluates the conditions based on the results, and makes a decision based on whether or not the conditions are met.

Many different types of rules can be used in correlation processing. For example, correlation processing can involve applying specified weights to the results for the analyzers on which conditions are established, for input to a condition based on the weighted results. As another example, correlation processing can involve combining results of analyzers, for input to a condition based on the combined results. As yet another example, results of one or more analyzers may be reviewed in light of an external event, such as activation of a fire alarm, to decide whether or not to construct an "event" for the database at the cluster stage of processing Intelligent Event Determination The above-described pipeline architecture may be used to implement one embodiment of the techniques described hereafter, although as will be apparent to those skilled in the art, embodiments may be implemented in any surveillance system, and are not limited to this architecture.

In addition, the techniques disclosed herein are described using facial recognition as a means for object or person recognition, however, any type of object recognition process may be used to identify any object whose image is obtained in a surveillance system, such as a weapon, suitcase, vehicle and the like. Furthermore, although the techniques are described using video cameras, it will be apparent to those skilled in the art that any camera or device used to produce a sample can be used. For example, voice samples may be recorded from multiple recorders and used as identification input.

Figure 4:
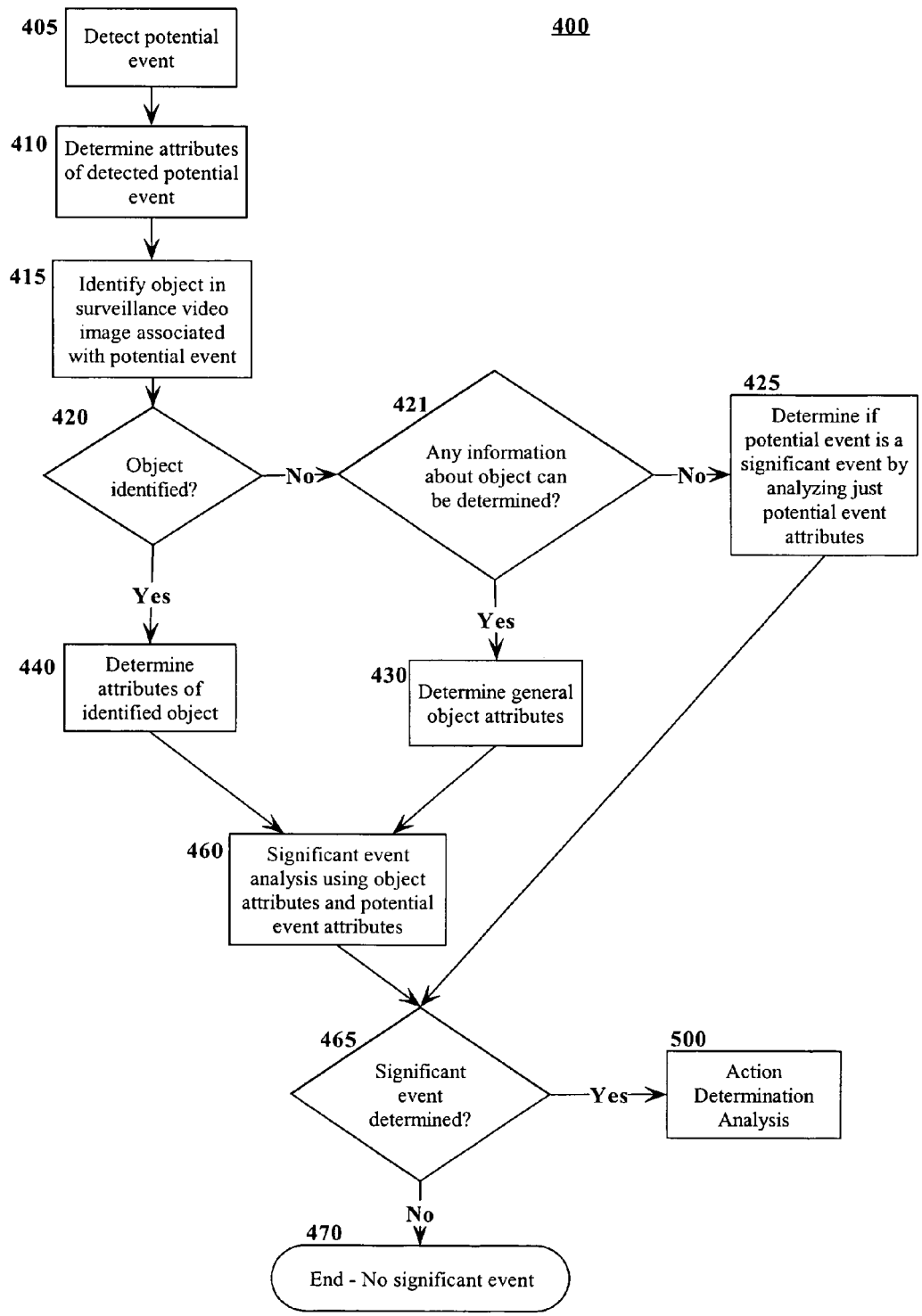
FIG. 4 is a flowchart illustrating one embodiment of a method for determining the occurrence of a significant event and appropriate action to take upon determination of significant event.

Referring to FIG. 4, a flowchart illustrating an event determination process 400, in accordance with one embodiment of the present invention. The process begins at step 405 when a potential event is detected in a video surveillance system. If implemented using the architecture disclosed in the co-pending Pipeline application, for example, the potential event may be detected as part of a "P1" motion sensing or gross object finding application that uses a P1 pipeline API to communicate with the surveillance system.

For example, potential event detection could occur when an object with an attached Radio Frequency ID (RFID) tag passes through an RFID monitored portal. Alternatively, a potential event could be detected by infrared sensors, motion sensors, optical sensors, audio sensors, or other sensors that are connected to the surveillance network 302 (e.g., sensor 320). For example, a motion sensor could be used to detect motion at a particular entry to a protected area.

As another alternative, an automated video motion detection process may be used to detect motion in a video feed, either live or recorded. As another alternative, a gross object finding application may be used to detect that not only has motion occurred at a particular entrance of a secure area, but that the detected motion is the motion of a person, and not that of some other type of object, such as a machine, vehicle, or animal. In yet another alternative, when a system is intended to detect the entrance of a person into a secure area and create an alarm for a person entering an area, but to specifically not generate an alarm for the detection of a person exiting a secured area, a motion detection process that detects directional movement may be used. Many methods of motion detection, gross object detection and detection of the direction of movement are known to those skilled in the art and can be used by embodiments of the present invention to detect a potential event. When using the pipeline architecture disclosed in the Pipeline application, these types of motion detection processes that analyze video stream data could be Quick Frame P1 applications.

Potential events may also be detected by external systems and communicated to the surveillance system. Referring back to FIG. 3, a potential event may be determined by external system 325 and communicated to the surveillance system server 340 through surveillance network 302. Examples of such potential external events are fire alarms, environmental input alarms, key card system alerts, RFID system alerts, etc.

At step 410, event attributes of the potential event are determined. For example, if the potential event is motion detected by a motion detector, potential event attributes could include such information as location of the motion detector, direction of movement, and time of motion detection. Potential event attributes may also be derived from the input from a plurality of cameras in the multi-camera surveillance system. For example, a first camera may detect the presence of a person at an entry, and a second camera may detect the presence of a person walking down a hallway connected to the entry a few seconds after the first camera detected a presence. In this example, attributes, such as multi-camera "cluster events", may be determined when using the architecture disclosed in the Pipeline application. Potential event attributes may also include attributes of the external system input, such as an identification of the person associated with a key card entry, or time and location of a fire alarm.

When a potential event is detected, an image that is associated with the potential event is identified from the video surveillance system. If the potential event was detected through video motion detection, the image associated with the potential event is the frame or frames of video that caused the video motion detection to occur. If the potential event was detected by an external system or by a sensor, the video surveillance system image associated with the potential event is determined by identifying the video image taken at the location and time of the potential event. For example, a potential event may be detected by a trip-wired camera that is external to the video surveillance system. In this case, the appropriate image or clip from the video surveillance system is identified.

As shown by step 415, the video surveillance system image that is associated with the detected potential event is analyzed in order to identify an object. One common object identification process that may be performed as part of step 415 is a facial recognition process, however, embodiments of the present invention may use any known method to recognize any type of object in an image. Characteristic parameters of the object in the image associated with a potential event may be extracted and used to create a set of identifying information. This set of identifying information, referred to herein as the "target identifying information", may be compared to stored sets of identifying information associated with known objects to identify the object associated with the potential event. In an embodiment of the present invention that uses the pipeline architecture of the Pipeline Application, any third-party software can be used as a P2 or P3 application to extract target identifying information.

For example, in the context of a facial recognition system, the identified image contains an image of a person's face as captured in a frame of a video surveillance camera associated with a potential event. For facial recognition systems, the set of identifying information is sometimes called a "feature set", and the target feature set extracted from the image associated with the potential event is compared to feature sets of known persons to determine a best match. Any method can be used to identify a person by comparing the target feature set with stored feature sets associated with known persons, such as the method disclosed in the Recognition application.

At step 420, it is determined whether an object was successfully identified in step 415. For example, a confidence score may be returned from the matching process and compared to a minimum threshold in order to determine whether the match is close enough to reliably identify the object.

If an object is successfully identified in step 420, additional information associated with the identified object is determined at step 440. For example, at step 415, it is determined that the person in the potential event image is "Adam." At step 440, information associated with Adam, such as security clearance level, list of authorized areas, and authorized time periods, may be determined. In one embodiment, this information may be stored in one or more databases in data store 360.

If no object is positively identified at step 420, the process continues to step 421, where the results of the recognition process are analyzed to determine if any information about the object in the image can be identified, even though the object itself cannot be positively identified. For example, the object identification process may return a list of potential candidates whose confidence scores exceeded a minimum threshold, but of which no one match to a potential candidate was determined to be the single best match. In this case, the attributes of the potential candidates are examined to determine similarities at step 430. For example, there may be two potential candidates, and each of the candidates possesses the same security clearance level. In this case, while a single person cannot be reliably determined, a security clearance level for the unidentified person can be reliably determined, as only a single security clearance level is associated with each potential candidate.

As another example, the object in the image may be determined as belonging to a particular group or class of objects at step 421. In this case, the attributes of the group are determined at step 430. As another example, the object in the image may be determined as definitely not belonging to specific groups or classes at step 421. Correlation processing as described in the Pipeline architecture may also be performed to determine any general object attributes.

If object attributes are identified at either step 440 or step 430, the attributes identified in either step 440 or step 430 and the event attributes determined in step 410 are used by the significant event analysis step 460 to determine if a "significant event" requiring action has occurred.

If the analysis performed in step 460 determines that the potential event is not a significant event, i.e., an event that does not require the system to perform some action, the process comes to an end at step 470. If the analysis performed in step 460 determines that the potential event is a significant event requiring action, the process continues to step 500, Action Determination Analysis, to determine the action(s) that the system should perform.

For example, an employee "Ann" may be authorized to enter Secure Area 1 during her working hours, which are 9 a.m. to 5 p.m., Monday through Friday. This information is stored in a system management database in data store 360. Suppose employee Ann enters Secure Area 1 at 4 p.m. on a Monday. A video camera placed at the entryway of Secure Area 1 detects the motion of Ann entering the area, which is a potential event (step 405). In this example, the attributes of the detected potential event are its location and time (step 410). A recognition process identifies Ann as the person entering Secure Area 1 (step 415). The time period that Ann is authorized to enter Secure Area 1 is determined to be 9-5, M-F (step 440). In this example, it is determined that Ann is authorized to enter Secure Area 1, and therefore the potential event is determined not to be a "significant event" at step 465.

As another example, suppose employee Ann enters Secure Area 1 at midnight on a Sunday. In this case, the significant event analysis of step 460 determines that this is a significant event, as Ann is not authorized to enter Secure Area 1 at this time, and the process continues to step 500, where an appropriate action, such as notifying security personnel, is performed. As yet another example, suppose employee Ann enters Secure Area 2 at 4 p.m. on a Monday. Since Ann is not authorized to enter Secure Area 2 at any time, this is a significant event, and the process likewise continues to step 500, where action appropriate for this situation is determined and performed.

As another example, suppose employee Ann is an employee belonging to the Food Services group. The executive suite is a secure area that only allows Food Service employees to enter between the hours of noon and 2 p.m., Monday through Friday. Through group membership association information determined at step 440, it can be determined at step 460 that Ann entering the executive suite area at 4 p.m. on a Monday is a significant event.

As yet another example, suppose three people, Andrew, Barb and Carl, are associated with the "executive" group, which allows entry to the executive suite at any time. The executive group is the only group allowed access to the executive suite on a Sunday. A person is detected entering the executive suite on a Sunday, however the person cannot be positively identified (steps 420-421). It can be positively determined, however, that the person detected entering the executive suite is not Andrew, Barb or Carl (steps 421-430). This can be used to determine that a significant event has occurred at step 460. As another example, a meeting with persons unknown to the system may be scheduled at 2 p.m. on a particular day in the executive suite conference room. In this case, the detection of an unknown person in the executive suite hallway at 2:15 p.m. on this day can be determined not to be a significant event, whereas any other day and time, this would be a significant event.

If no information about the object can be determined, the process continues from step 421 to step 425. At step 425, significant event analysis is performed using only the event attributes determined in step 410.

For example, a fire alarm may be triggered by an external system. This may be determined to be a significant event and cause the surveillance system to send notifications to certain persons with a video image of everyone captured in a camera video image in the area of the fire alarm at the time of the alarm in order to identify possible arson suspects, even though no motion was detected and no objects were identified. As another example, a potential event of persons in the information systems area may be detected. The system may be configured such that persons in the information systems area is not a significant event unless an alarm is generated by the network system for a network security breach, such as a breach of a firewall.

In one embodiment, information from external systems or sensors can be used when determining whether a significant event has occurred. For example, a person may use a keycard system to gain entry to a secure area. A video camera may also monitor the secure area entryway. If the keycard system determines that the keycard used by a person to gain access to the secure area is associated with a person "A", and "A" is allowed access to the secure area, the keycard system may allow entry of the person. However, the entry of a person into the secure area causes a potential event to be detected by the surveillance system, and process 400 is executed. If the person identified by the surveillance system is "A", then this is not a significant event, and no action is taken. However, if the surveillance system positively determines that the person entering with A's keycard is not A (even if the system cannot positively identify who the person is) then a significant event is determined and an appropriate action can be generated, such as notifying security personnel and/or locking down the secure area.

As another example, a system may be configured such that unidentified people in the Information Systems area are not significant events and do not generate alarms or other actions. However, if the network system determines that the mail server has gone down or the firewall has been breached, for example, and notifies the surveillance system, then having unidentified people in the Information Systems area may then be determined to be a significant event.

In one embodiment, information gathered from multiple cameras can be used when determining whether a significant event has occurred. For example, a camera detects the presence of a person in Area A, moving in the direction of Area B, but the person cannot be positively identified. A person is then detected in Area B, which is connected to Area A, a short while after the Area A detection. The person in Area B can be positively identified. In this example, it may be possible to then make a positive identification of the person in Area A as being the same person. If this person does not have authorization to be in Area A, a significant event can then be determined to have occurred, and appropriate action determined and taken. Correlation processing and cluster event information associated with the disclosed Pipeline architecture may be used in significant event determination.

In one embodiment, identifying information that is compared to the target identifying information may come from various external sources. For example, in a campus of numerous office buildings, each office building may have its own surveillance system. However, a person known to one building's system may be identified as a disgruntled employee. Identifying information for this person can be imported into the surveillance systems of the other buildings in the campus so that appropriate actions can be taken upon determining that this person has entered any building in the campus. In addition to identifying information, attributes of persons external to the surveillance system can be stored in appropriate databases in data store 360.

Action Determination Analysis

As shown in FIG. 4, when a significant event is determined to have occurred at step 465, step 500 is performed to determine the appropriate action(s) to take. Actions are occurrences caused by the detection of significant events. While in other systems, the only action that is taken is to alert security of a potential breach or sound an alarm whenever any potential event is detected, the techniques disclosed herein allow various combinations of actions to be defined and selected depending on the nature of the determined significant event.

Significantly, actions in the present invention may include relevant information about the event that triggered the action. As discussed above, an event may be associated with more than one action. Likewise, a particular action may be associated with more than one event. For example, a first type of event is an unidentified person entering a particular area. A second type of event is an identified, but unauthorized, person entering the area. Upon the detection of an event of the first-type, a first action of sending a video clip to security personnel and a second action of initiating audio recording in the area may both be taken. However, when an event of the second type is detected, the only action configured may be initiating the audio recording. There is potentially a many-to-many relationship between events and actions.

There is a wide variety of actions that a system may take upon the determination of a significant event. Examples of possible actions include: paging on-call security personnel; emailing a particular person; calling everyone who is a member of a particular class of persons; sending a message to the police; emailing a video clip to police and various identified persons; locking down a particular area; changing camera orientation, resolution or initiating camera recording; powering up idle cameras; initiating audio recording in a particular area; sounding an alarm; initiating an alarm that allows a remote user to communicate orally with a detected person; broadcasting a multi-media email to a group of persons; operating certain automated devices in the local surveillance area, e.g., turning on a light; sending camera output to a video enabled cellular telephone; text messaging. Actions can include operations carried out by the video surveillance system, such as saving a video feed to a file, or operations dispatched to notification terminal 330, such as dispatching an electronic mail message or dialing a pager. If the determined appropriate action is notification, various types of information can be included in the notification in order to help the receiver of the alert assess the situation. For example, video images or clips can be attached to emails or sent to video enabled cell phones. Event attributes or object attributes can be included in the notification.

Different actions can be defined for and associated with different events. For example, if a determined significant event is person B is in Secure Area 1 at an unauthorized time, an email may be sent to B's supervisor. If a significant event is that a person who is identified as either person B or C is in Secure Area 1 at an unauthorized time for either B or C, emails may be sent to both B's and C's supervisors, as well as a group director. If a significant event is that an unidentified person is in Secure Area 1 at any time, pages may be sent to security personnel, an alarm sounded and Secure Area 1 locked down. If a person who is not identified, but has been determined to not be a member of the "Executives" group, is detected in the executive suite after working hours, on-call security may be called, the director may be faxed and the CEO paged.

To implement the action determination analysis, each possible separate action can be named and stored in a database. Other intelligent action conditions may be used to ensure appropriate action is taken. For example, if the page to a particular person is not answered within a certain amount of time, the system can be configured to page a backup person.

Action determination analysis considers the significant event information, stored information and external information to determine what actions should be performed.

Embodiments of the present invention allow for intelligent event determination in a surveillance system. Object identification and group memberships can be used to determine if a significant event has occurred and the appropriate actions to take. The improved surveillance system of the present invention reduces the number of false alarms and assists users to take appropriate action upon occurrence of a significant event.

General Computer System

Figure 2:
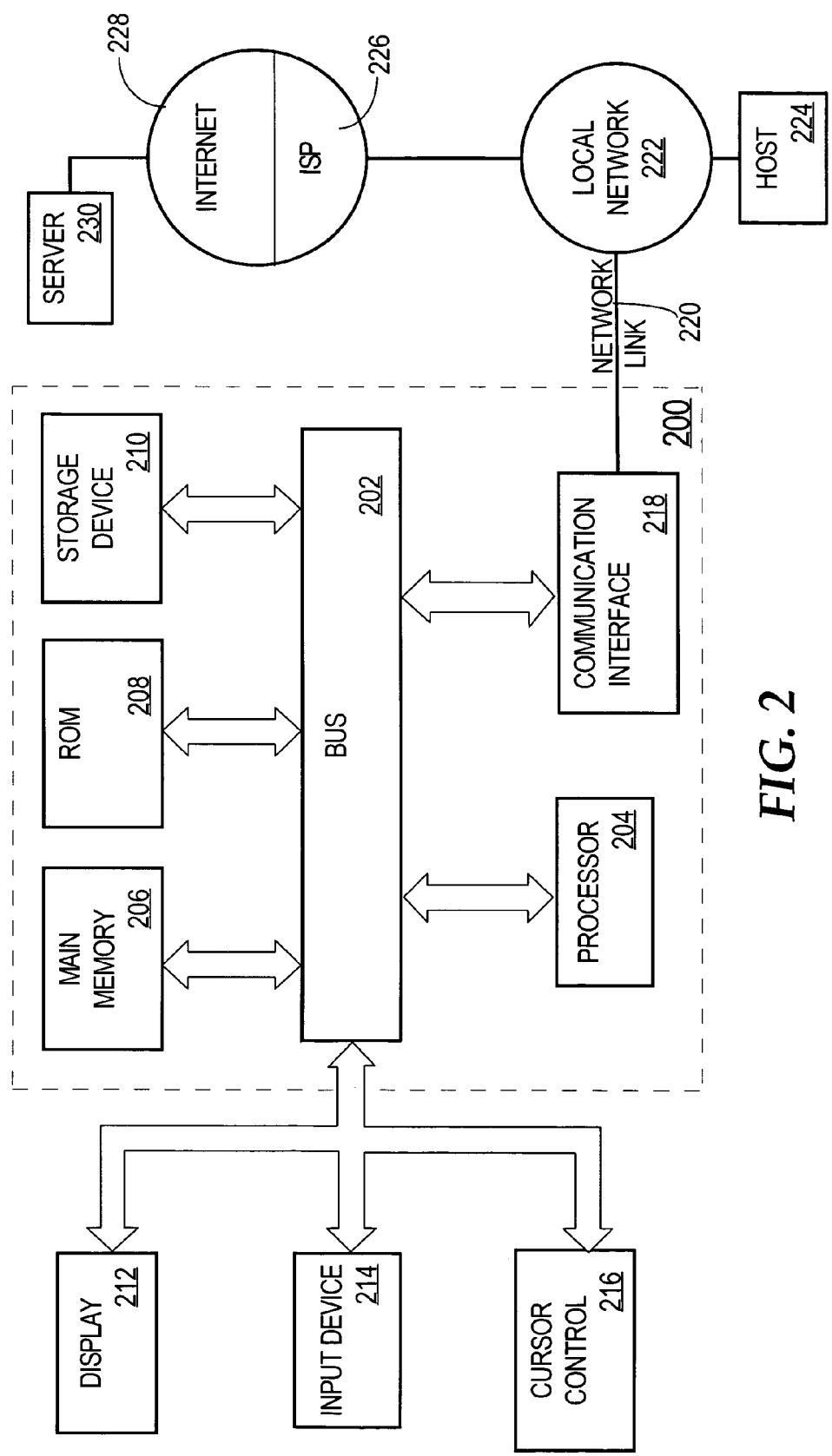
FIG. 2 is a block diagram that illustrates a computer system upon which an embodiment of the invention may be implemented.

FIG. 2 is a block diagram that illustrates a computer system 200 upon which an embodiment of the invention may be implemented. Computer system 200 includes a bus 202 or other communication mechanism for communicating information, and a processor 204 coupled with bus 202 for processing information. Computer system 200 also includes a main memory 206, such as a random access memory (RAM) or other dynamic storage device, coupled to bus 202 for storing information and instructions to be executed by processor 204. Main memory 206 also may be used for storing temporary variables or other intermediate information during execution of instructions to be executed by processor 204. Computer system 200 further includes a read only memory (ROM) 208 or other static storage device coupled to bus 202 for storing static information and instructions for processor 204. A storage device 210, such as a magnetic disk or optical disk, is provided and coupled to bus 202 for storing information and instructions.

Computer system 200 may be coupled via bus 202 to a display 212, such as a cathode ray tube (CRT), for displaying information to a computer user. An input device 214, including alphanumeric and other keys, is coupled to bus 202 for communicating information and command selections to processor 204. Another type of user input device is cursor control 216, such as a mouse, a trackball, or cursor direction keys for communicating direction information and command selections to processor 204 and for controlling cursor movement on display 212. This input device typically has two degrees of freedom in two axes, a first axis (e.g., x) and a second axis (e.g., y), that allows the device to specify positions in a plane.

The invention is related to the use of computer system 200 for implementing the techniques described herein. According to one embodiment of the invention, those techniques are performed by computer system 200 in response to processor 204 executing one or more sequences of one or more instructions contained in main memory 206. Such instructions may be read into main memory 206 from another machine-readable medium, such as storage device 210. Execution of the sequences of instructions contained in main memory 206 causes processor 204 to perform the process steps described herein. In alternative embodiments, hard-wired circuitry may be used in place of or in combination with software instructions to implement the invention. Thus, embodiments of the invention are not limited to any specific combination of hardware circuitry and software.

The term "machine-readable medium" as used herein refers to any medium that participates in providing data that causes a machine to operation in a specific fashion. In an embodiment implemented using computer system 200, various machine-readable media are involved, for example, in providing instructions to processor 204 for execution. Such a medium may take many forms, including but not limited to, non-volatile media, volatile media, and transmission media. Non-volatile media includes, for example, optical or magnetic disks, such as storage device 210. Volatile media includes dynamic memory, such as main memory 206. Transmission media includes coaxial cables, copper wire and fiber optics, including the wires that comprise bus 202. Transmission media can also take the form of acoustic or light waves, such as those generated during radio-wave and infra-red data communications.

Common forms of machine-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of machine-readable media may be involved in carrying one or more sequences of one or more instructions to processor 204 for execution. For example, the instructions may initially be carried on a magnetic disk of a remote computer. The remote computer can load the instructions into its dynamic memory and send the instructions over a telephone line using a modem. A modem local to computer system 200 can receive the data on the telephone line and use an infra-red transmitter to convert the data to an infra-red signal. An infra-red detector can receive the data carried in the infra-red signal and appropriate circuitry can place the data on bus 202. Bus 202 carries the data to main memory 206, from which processor 204 retrieves and executes the instructions. The instructions received by main memory 206 may optionally be stored on storage device 210 either before or after execution by processor 204.

Computer system 200 also includes a communication interface 218 coupled to bus 202. Communication interface 218 provides a two-way data communication coupling to a network link 220 that is connected to a local network 222. For example, communication interface 218 may be an integrated services digital network (ISDN) card or a modem to provide a data communication connection to a corresponding type of telephone line. As another example, communication interface 218 may be a local area network (LAN) card to provide a data communication connection to a compatible LAN. Wireless links may also be implemented. In any such implementation, communication interface 218 sends and receives electrical, electromagnetic or optical signals that carry digital data streams representing various types of information.

Network link 220 typically provides data communication through one or more networks to other data devices. For example, network link 220 may provide a connection through local network 222 to a host computer 224 or to data equipment operated by an Internet Service Provider (ISP) 226. ISP 226 in turn provides data communication services through the world wide packet data communication network now commonly referred to as the "Internet" 228. Local network 222 and Internet 228 both use electrical, electromagnetic or optical signals that carry digital data streams. The signals through the various networks and the signals on network link 220 and through communication interface 218, which carry the digital data to and from computer system 200, are exemplary forms of carrier waves transporting the information.

Computer system 200 can send messages and receive data, including program code, through the network(s), network link 220 and communication interface 218. In the Internet example, a server 230 might transmit a requested code for an application program through Internet 228, ISP 226, local network 222 and communication interface 218.

The received code may be executed by processor 204 as it is received, and/or stored in storage device 210, or other non-volatile storage for later execution. In this manner, computer system 200 may obtain application code in the form of a carrier wave.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A method of determining an occurrence of a significant event requiring action in a surveillance system, the method comprising computer-implemented steps of:

for each entity of a plurality of entities, storing one or more event attribute criteria associated with said each entity, wherein the one or more event attribute criteria associated with said each entity indicates at least one of (a) time criteria, (b) location criteria, or (c) direction of motion criteria;

wherein the plurality of entities includes a first entity and a second entity;

wherein the one or more event attribute criteria associated with the first entity are different than the one or more event attribute criteria associated with the second entity;

after storing the one or more event attribute criteria for each entity of the plurality of entities, detecting a potential event;

wherein the potential event is associated with a video surveillance image;

determining one or more event attributes about the potential event, wherein the one or more event attributes indicates at least one of (1) a time, (2) a location, or (3) a direction of motion;

selecting, from among the plurality of entities, an entity that matches an object in the video surveillance image;

if the first entity is selected, then comparing the one or more event attributes about the potential event with the one or more event attribute criteria associated with the first entity to determine whether an action should be triggered by the video surveillance system; and if the second entity is selected, then comparing the one or more event attributes about the potential event with the one or more event attribute criteria associated with the second entity to determine whether an action should be triggered by the video surveillance system; and in response to determining that an action should be triggered by the video surveillance system:
determining at least one action to be triggered by the video surveillance system, and
triggering the at least one action;

wherein each entity of said plurality of entities is an object or a group of objects;

wherein the steps are performed by one or more computing devices.

2. The method of claim 1 wherein the step of detecting a potential event comprises:
receiving input from a sensor.

3. The method of claim 1 wherein the step of detecting a potential event comprises:
detecting motion in a video feed from a camera in the surveillance system.

4. The method of claim 1 wherein the step of detecting a potential event comprises:
receiving a potential event indicator, from an external system, by the surveillance system.

5. The method of claim 1, wherein the potential event is a motion detection event, and the one or more event attributes include location and time of motion detection.

6. The method of claim 1, wherein the step of selecting the entity that matches the object in the video surveillance image comprises:
determining a group associated with the object in the video surveillance image; and determining one or more event attribute criteria associated with the group associated with the identified object in the video surveillance image.

7. The method of claim 1, wherein the step of selecting the entity that matches the object in the video surveillance image comprises:
   determining a group not associated with the object in the video surveillance image;
   determining one or more event attribute criteria associated with the determined group; and
   determining that the one or more event attribute criteria associated with the object in the video surveillance image does not include the one or more event attribute criteria associated with the determined group.

8. The method of claim 1, wherein the one or more event attributes include a time, and the one or more event attribute criteria associated with the first entity include an authorization time range, wherein the step of comparing comprises:
   determining that the first potential event should trigger an action by the video surveillance system when the time is not within the authorization time range.

9. The method of claim 1, wherein the step of determining at least one action comprises analyzing the one or more event attributes and the one or more event attribute criteria associated with the first entity or the second entity to determine:
   at least one person to notify about the potential event, and
   a method of notification associated with the at least one person.

10. The method of claim 9, wherein the determined method of notification includes sending a multimedia e-mail that includes the surveillance video image associated with the potential event.

11. The method of claim 1, wherein the potential event is a first potential event, additionally comprising the steps of:
   determining a second potential event;
   determining one or more second event attributes about the second potential event;
   analyzing the one or more second event attributes and one or more second event attribute criteria associated with a third entity in the plurality of entities to determine whether the second potential event should trigger an action by the video surveillance system; and
   in response to determining that the second potential event should trigger an action by the video surveillance system, determining a second action to be triggered by the video surveillance system, wherein the second action is the same as an action determined for the first potential event.

12. A computer-readable memory medium storing instructions which, when executed by one or more processors, cause performance of the method recited in claim 1.

13. A computer-readable memory medium storing instructions which, when executed by one or more processors, cause performance of the method recited in claim 2.

14. A computer-readable memory medium storing instructions which, when executed by one or more processors, cause performance of the method recited in claim 3.

15. A computer-readable memory medium storing instructions which, when executed by one or more processors, cause performance of the method recited in claim 4.

16. A computer-readable memory medium storing instructions which, when executed by one or more processors, cause performance of the method recited in claim 5.

17. A computer-readable memory medium storing instructions which, when executed by one or more processors, cause performance of the method recited in claim 6.

18. A computer-readable memory medium storing instructions which, when executed by one or more processors, cause performance of the method recited in claim 7.

19. A computer-readable memory medium storing instructions which, when executed by one or more processors, cause performance of the method recited in claim 8.

20. A computer-readable memory medium storing instructions which, when executed by one or more processors, cause performance of the method recited in claim 9.

21. A computer-readable memory medium storing instructions which, when executed by one or more processors, cause performance of the method recited in claim 10.

22. A computer-readable memory medium storing instructions which, when executed by one or more processors, cause performance of the method recited in claim 11.

23. A method of determining an occurrence of a significant event requiring action in a surveillance system, the method comprising computer-implemented steps of:
   capturing a first video surveillance image from a first camera of the surveillance system;
   capturing a second video surveillance image from a second camera of the surveillance system that is different than the first camera;
   detecting a first potential event in the first video surveillance image;
   determining one or more first event attributes about the first potential event, wherein the one or more first event attributes relate to the first potential event but do not relate to the identity of any objects in the first video surveillance image;
   detecting a second potential event in the second video surveillance image;
   determining one or more second event attributes about the second potential event, wherein the one or more second event attributes relate to the second potential event but do not relate to the identity of any objects in the second video surveillance image;
   comparing the one or more first event attributes with the one or more second event attributes to determine that the first video surveillance image correlates with the second video surveillance image;
   based on the correlation of the first video surveillance image with the second video surveillance image, determining that an action should be triggered by the video surveillance system; and
   in response to determining that an action should be triggered by the video surveillance system:
      determining at least one action to be triggered by the video surveillance system, and
      triggering the at least one action;
   wherein the steps are performed by one or more computing devices.

24. A method of determining an occurrence of a significant event requiring action in a surveillance system, the method comprising computer-implemented steps of:
   detecting a motion event;
   wherein the motion event is associated with a video surveillance image;
   determining the direction of the motion that was detected;
   determining one or more event attribute criteria associated with an object in the video surveillance image, wherein the one or more event attribute criteria do not relate to the identity of one or more objects in the video surveillance image;
   analyzing one or more event attributes about the motion event, including the direction of the motion, and the one or more event attribute criteria to determine whether the motion event should trigger an action by the video surveillance system; and in response to determining that the motion event should trigger an action by the video surveillance system:
  determining at least one action to be triggered by the video surveillance system,
  triggering the at least one action;
wherein the steps are performed by one or more computing devices.

25. A method of determining an occurrence of a significant event requiring action in a surveillance system, the method comprising computer-implemented steps of:
  detecting a potential event;
  wherein the potential event is associated with a video surveillance image;
  determining one or more event attributes about the potential event, wherein the one or more event attributes relate to the potential event but do not relate to the identity of any objects in the video surveillance image;
  identifying a list of known objects that may match an object in the video surveillance image; and
  determining one or more event attribute criteria that are common among objects in the list of known objects, wherein the one or more event attribute criteria do not relate to the identity of one or more objects in the video surveillance image;
  analyzing the one or more event attributes and the one or more event attribute criteria to determine whether the potential event should trigger an action by the video surveillance system; and
  in response to determining that the potential event should trigger an action by the video surveillance system:
    determining at least one action to be triggered by the video surveillance system, and
    triggering the at least one action;
  wherein the steps are performed by one or more computing devices.

26. A method of determining an occurrence of a significant event requiring action in a surveillance system, the method comprising computer-implemented steps of:
  for each object of a plurality of objects, storing an authorization time range for said each object;
  after storing the authorization time range for said each object of the plurality of objects, detecting a potential event;
  wherein the potential event is associated with a video surveillance image;
  determining a particular time at which the potential event occurred;
  determining an identity of an object in the video surveillance image;
  based on the identity of the object and the stored authorization time ranges, determining an authorization time range for the object;
  comparing the particular time to the authorization time range for the object to determine whether the potential event should trigger an action by the video surveillance system; and
  in response to determining that the potential event should trigger an action by the video surveillance system:
    determining at least one action to be triggered by the video surveillance system, and
    triggering the at least one action;
  wherein the steps are performed by one or more computing devices.

27. A method of determining an occurrence of a significant event requiring action in a surveillance system, the method comprising computer-implemented steps of:
  detecting a potential event;
  wherein the potential event is associated with a video surveillance image;
  determining one or more event attributes about the potential event, wherein the one or more event attributes relate to the potential event but do not relate to the identity of any objects in the video surveillance image;
  determining one or more event attribute criteria associated with an object in the video surveillance image associated with the potential event, wherein the one or more event attribute criteria do not relate to the identity of one or more objects in the video surveillance image;
  analyzing the one or more event attributes and the one or more event attribute criteria to determine whether the potential event should trigger an action by the video surveillance system; and
  in response to determining that the potential event should trigger an action by the video surveillance system:
    selecting, from a plurality of possible persons, at least one person to notify about the potential event based on the one or more event attributes and the one or more event attribute criteria, and
    notifying the at least one person about the potential event;
  wherein the steps are performed by one or more computing devices.

28. A computer-readable memory medium storing instructions which, when executed by one or more processors, cause performance of the method recited in claim 23.

29. A computer-readable memory medium storing instructions which, when executed by one or more processors, cause performance of the method recited in claim 24.

30. A computer-readable memory medium storing instructions which, when executed by one or more processors, cause performance of the method recited in claim 25.

31. A computer-readable memory medium storing instructions which, when executed by one or more processors, cause performance of the method recited in claim 26.

32. A computer-readable memory medium storing instructions which, when executed by one or more processors, cause performance of the method recited in claim 27.

33. The method of claim 1, wherein each entity of the plurality of entities is an object.

34. A computer-readable memory medium storing instructions which, when executed by one or more processors, cause performance of the method recited in claim 33.

35. The method of claim 33, wherein the step of selecting the entity that matches the object in the video surveillance image comprises:
  comparing a set of identifying information extracted from the video surveillance image to a plurality of stored sets of identifying information;
  calculating a confidence score for each comparison;
  for each stored set of identifying information whose comparison confidence score exceeds a predetermined minimum threshold, determining an object associated with the stored set of identifying information; and
  identifying a best matching object for the object in the video surveillance image by determining which object has a greatest number of comparison confidence scores that exceed the predetermined minimum threshold.

36. The method of claim 33, wherein the step of selecting the entity that matches the object in the video surveillance image comprises:

identifying a list of known objects that may match the object in the video surveillance image; and determining, based on one or more event attribute criteria associated with each object in the list of known objects, one or more common event attribute criteria associated with a plurality of objects in the list of known objects.

37. The method of claim 36, wherein the step of identifying a list of known objects that may match the object in the video surveillance image comprises:

comparing a set of identifying information extracted from the video surveillance image to a plurality of stored sets of identifying information;

calculating a confidence score for each comparison;

for each stored set of identifying information whose comparison confidence score exceeds a predetermined minimum threshold, determining an object associated with the stored set of identifying information and including the determined associated object in the list of known objects.

38. A computer-readable memory medium storing instructions which, when executed by one or more processors, cause performance of the method recited in claim 35.

39. A computer-readable memory medium storing instructions which, when executed by one or more processors, cause performance of the method recited in claim 36.

40. A computer-readable memory medium storing instructions which, when executed by one or more processors, cause performance of the method recited in claim 37.

* * * * *

UNITED STATES PATENT AND TRADEMARK OFFICE
CERTIFICATE OF CORRECTION

PATENT NO. : 7,847,820 B2  Page 1 of 1
APPLICATION NO. : 11/082026
DATED : December 7, 2010
INVENTOR(S) : Robert P. Vallone et al.

It is certified that error appears in the above-identified patent and that said Letters Patent is hereby corrected as shown below:

COLUMN 19
Claim 6: Line 2: Delete "identified".

Signed and Sealed this
Eighth Day of February, 2011

David J. Kappos
*Director of the United States Patent and Trademark Office*